United States Patent Office 2,879,850
Patented Mar. 31, 1959

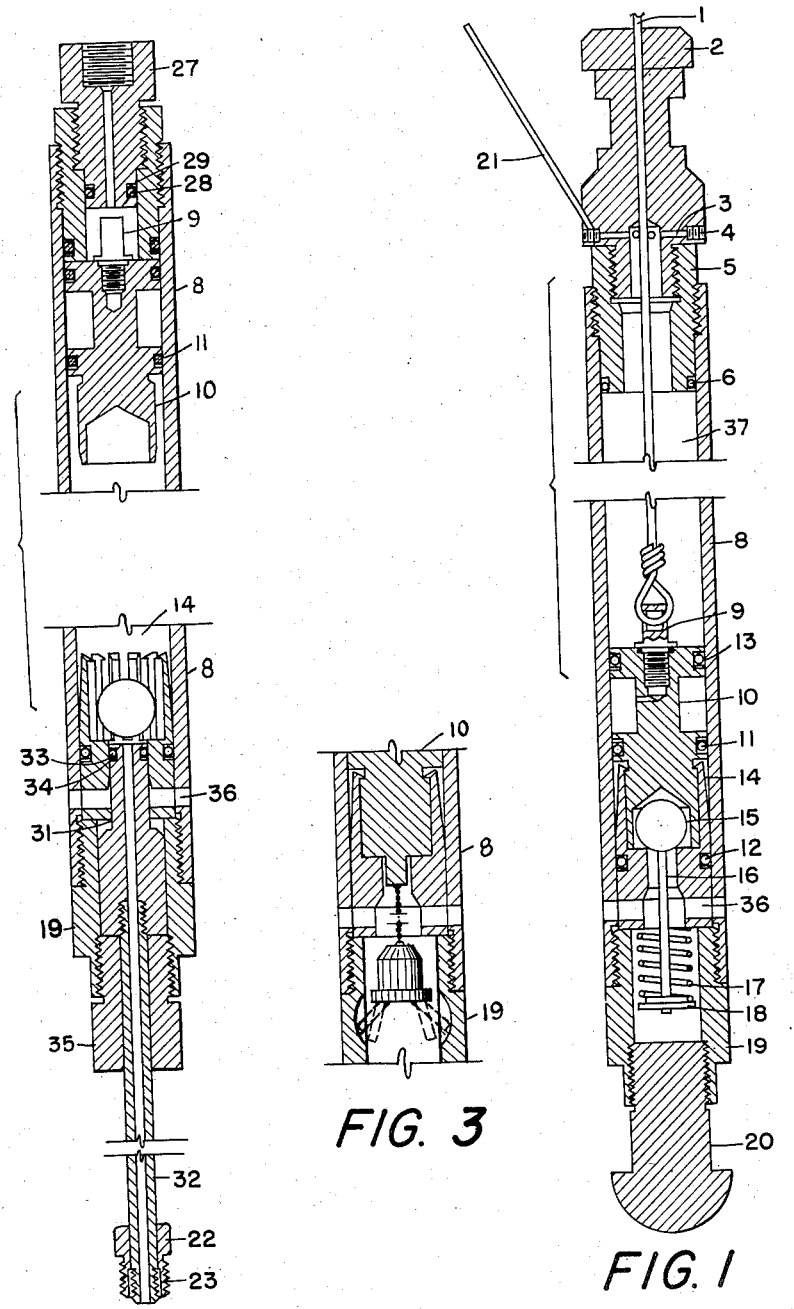

2,879,850
SAMPLING DEVICE
Paul G. Exline, Tulsa, Okla.
Application September 7, 1956, Serial No. 608,633
4 Claims. (Cl. 166—166)

This invention relates to the procurement of samples within deep well bores. More particularly it relates to new and useful improvements in devices for obtaining true samples under pressure conditions existing at the level where the sample is taken by means of a sample tester which is lowered into the well bore from the surface and then after the sample is taken the device is brought to the surface where the sample can be examined.

In recent years, the petroleum industry has come to a full realization of the importance of obtaining accurate data regarding hydrocarbon-bearing reservoirs. The determination, interpretation, and application of this data is commonly known by the broad term, reservoir engineering. Among the data pertinent to reservoir engineering, are drilling logs, formation sample logs, core records, electrical survey logs, and reservoir fluid characteristics. With these and other data, the reservoir engineers can predict the future recovery of hydrocarbon fluids and determine what methods of production will recover the maximum quantity of hydrocarbon fluid from the reservoir.

In the data enumerated above, the reservoir fluid characteristics are especially useful in predicting the behavior of the fluid in a hydrocarbon-bearing reservoir during the productive life of the reservoir. It is to be noted that hydrocarbon oil and gas produced at the surface of the ground has an entirely different set of physical characteristics at normal atmospheric pressure and temperature than the same oil and gas has in the reservoir at superatmospheric pressure and temperature. Hence, it is very desirable to obtain fluid samples which are truly representative.

The necessity of obtaining well bore samples of hydrocarbon fluids and transferring the sample unchanged from the sampler to laboratory apparatus for study, is known in the industry. Considerable difficulty has been experienced in the past in obtaining truly representative samples of hydrocarbon fluids. The devices which are now available to the industry for obtaining well bore samples have faulty design and construction, whereby the escape of gas or liquid from the sampler makes the remaining sample of fluid non-representative.

Heretofore it has been difficult to obtain samples which actually represent subsurface mixtures of oil and gas for the reason that such samples are taken at different pressures and temperature than those actually existing in the producing formation. Also, the oil contained in such samples has been intermingled with extraneous gas, i.e., gas which either was in solution originally or was liberated from solution at some higher pressure and later became mixed with the original undissolved gas.

It is obvious that such samples might have their gas content either increased or decreased from the amount of oil contained in the producing formation and the data obtained therefrom is not conclusive.

In other words, the oil when it actually existed in the formation might have been unsaturated so that it absorbed additional gas by the time the sample was taken. Upon analysis, such sample would liberate more gas per unit volume of oil than the oil originally contained. On the other hand, if the oil in the original reservoir were completely saturated with gas, reduction of pressure and change in temperature at the place where the sample was taken would result in gas liberation so that the sample contains less gas per unit volume of oil than was originally contained in an equal volume in the reservoir.

It is therefore a principal object of the present invention to provide a sampling device whereby the disadvantages of the prior art devices are obviated. Another object of my invention is to provide a sampling device which is of small radial dimensions and light in weigth, and yet capable of effectively obtaining samples and withstanding the pressures existing at the level of the sample being taken. Other objects and advantages of the invention will become apparent to persons skilled in the art by reference to the following description and annexed drawings, in which like numerals are employed to designate like parts throughout:

Figure 1 is an elevation view, partly in cross section, of the sampling device wherein the piston is held at the base of the sampler.

Figure 2 is an elevation view, partly in cross section, of the sampling device wherein the piston is at the top position and the necessary adapters attached thereto for removing the sample contained in the device. The adapters will be explained later.

Figure 3 is an elevation showing an alternative method of preventing the backflow of the sample out through the inlet ports.

Referring more in detail to the drawings:

In Figure 1 the sampling device or sampler with the piston 10 at the bottom of the barrel or tubular member 8 is ready for running in the hole. The fishing neck, 2 has three holes, equally spaced around the circumference and drilled at an angle of about 30° to the axis of the instrument. A short piece of spring wire 21 is placed in each hole and fastened with a set screw. As the sampler is lowered down the well, the ends of these wires touch the tubing wall at three points and are bent inwardly slightly. When the sampling point has been reached, the sampler is pulled upward slowly by reeling in the wire line 1. When the springs reach a tubing joint, they snap out into the space between the tubing ends and prevent further ascent of the sampler. This stoppage is the surface indication to the operator of the exact point of sampling.

The wire line 1 is attached to the eye-bolt 9 in the top of the spool-shaped piston 10. The piston is held at the bottom of the sample chamber by twelve spring fingers 14 whose hooked ends engage a groove in the piston immediately below the bottom head. The angle of the groove and the stiffness of the fingers are such that a pull of about 50 to 125 pounds, preferably 85 to 95 pounds will cause the fingers to bend outwardly and release the piston.

When the operator has seen that the anchor springs have caught in a tubing joint, he slowly increases the tension on the line. Release of the piston 10 is made evident by a sudden reduction in tension. When this occurs, the operator slowly reels in the line, pulling the piston 10 up the sample chamber, tubular member or barrel 8, and sucking fluid past the spring-loaded ball check valve 15 at the bottom of the sample chamber.

Before the sampler is introduced into the well, the space in the sample chamber above the piston is filled with water. As the piston moves upward after its release, the water is forced out through the annular space 3 forming an outlet port around the wire line in the axial hole in the fishing neck. The hole size is chosen to control the piston speed and prevent it from moving upward too rapidly.

When the piston has moved upward substantially the full length of the barrel 8, it strikes the bottom of the connector 5 and stops. The operator is again made aware of this fact by the increase in tension in the line. This tension is increased until the force on the spring wires anchoring the sampler in place causes them to bend or buckle, allowing the sampler to be pulled out of the well. The length and diameter of the wires are selected to require a force of approximately 150 pounds to bend them over and release the sampler.

The various steps of the sampling procedure are all performed at the surface under the full control of the operator. While it is of some help to the operator to have a load indicator attached to the wire line reel, this is not necessary. With some experience, the behavior of the sampler can easily be judged from the "feel" of the line. Usually, the steps described above can be completed in less than five minutes.

After the filled sampler is recovered from the tubing, the fishing neck is removed and the eye-bolt 9 is unscrewed from the piston. The tie line 1 is cut off and the eye-bolt replaced.

The two heads of the piston are each grooved to receive an O-ring seal. The diameter of the piston is reduced between the heads to provide an air space. During the trip in the well, the pressure in this space remains near atmospheric and the pressure drop across each seal is substantially equal to the surrounding well pressure. This is the most effective condition of use of an O-ring seal, which is of the type known as "self-energizing," i.e., the higher the pressure drop across it, the tighter the seal. The preferred placement of the seals are denoted by the numerals 6, 11, 12, and 13a.

After the eye-bolt has been replaced in the piston, the tubing adapter 27 is screwed into the thread previously engaged by the fishing neck. A hydraulic pump with a pressure gage can be attached to the adapter and oil pumped in until sufficient pressure has been developed to move the piston slightly. At this point the pressures on both sides of the piston are substantially equal and the pressure indicated on the gage is called the initial sample pressure. An experienced operator can usually tell from the initial sample pressure whether or not a good sample has been obtained. If, for any reason, an unsatisfactory sample has been obtained, this information can quickly be obtained at the well head and a re-run made at once without loss of time in transferring and shipping an inferior sample to the laboratory.

When a good sample has been obtained, the sampler can be shipped with its contents to the laboratory for direct transfer into analysis equipment or the sample can easily be transferred into a shipping container in the field.

To transfer the sample, the end plug 20 is removed and the valve stem 16 is unscrewed from the valve ball. The transfer attachment 31 is inserted into the end of the sampler and, with the aid of the follower nut 35 pushed in until it just contacts the ball. Hydraulic oil is pumped into the chamber above the piston until the pressure is approximately 1,000 p.s.i. above the well pressure at the sampling point. This pressure is maintained while the sampler is slowly oscillated until all free gas in the sample goes into solution in the liquid phase. Connection is then made to the shipping container at the end of the transfer attachment. Pressure is maintained by manipulating the inlet valve of the shipping container while pumping hydraulic oil into the sampler, forcing the piston ahead of the hydraulic oil. When the piston reaches the end of its travel and engages the spring fingers, all of the sample has been transferred, the valve on the shipping container is closed, and the sampler disassembled for cleaning. The end of the transfer tube is given a concave spherical radius equal to the nylon ball. This end is also provided with a transverse slot so that the ball cannot close off the bore of the tube as the ball is lifted from its seat.

The check valve ball 15 is made of nylon to provide sufficient resiliency so that fine foreign particles suspended in the crude will not cause leakage. During the period the ball is holding pressure in the sampler, the narrow seat will emboss a shallow circular groove in the ball. For this reason, a new ball should be used for each run.

The valve 14 is a cylindrical member with the twelve spring fingers formed integrally with it. It contains four radial holes near the base for the inlet ports 36. The outer periphery of the lower end portion of the valve 14 and the mating inner periphery of the tubular member 8 are tapered upwardly and inwardly (not shown) to provide a wedging of the valve 14 in the tubular member 8 and limit the upward movement of the valve. The valve 14 is held in the lower end of the tubular member 8 by a retainer 19.

When running in a well producing high viscosity crude, it is sometimes desirable to attach a weight section to the lower end of the sampler to increase the rate of descent. This can be easily accomplished by providing weight sections in various lengths for screwing into the valve retainer, 19, in place of the end plug which is then screwed into the bottom of the weight section. The weight sections are made up of thin wall steel tubing with welded ends which can be filled with mercury or other heavy substance.

The sampler can be operated in an open hole or a casing without the anchor wires by jarring. For this operation it is necessary to use a weight section in order to provide sufficient inertia to release the piston. The usual procedure is to lower the sampler to about 30 feet above the desired sampling point and release the brake on the wire line reel. The sampler is allowed to fall freely for 30 feet and the brake is suddenly applied to the reel, stopping it as sharply as possible. The force developed by the sudden deceleration of the mass of the weight section and all parts of the sampler, except the piston, will pull the spring fingers off the piston. The success of this method will depend upon the maximum velocity attainable by free fall, the depth and the weight of the sampler. If the wire line diameter is .072 in., the free fall velocity must exceed $$V = .0047 P \sqrt{\frac{D}{W}}$$

where

V is the velocity in feet per second.
P is the pull force in pounds necessary to separate the piston from the fingers.
D is the depth in feet.
W is the weight of the sampler and weight section in pounds.

This equation is derived as follows: If a mass is suspended on a spring and is given a downward velocity V ft. per min. it will decelerate as the spring is stretched. The maximum pull that spring exerts on the mass will be $$P = V \sqrt{\frac{WK}{G}} \qquad (1)$$

where

W = weight of mass—pounds
K = spring stiffness—pounds per foot.
G = acceleration of gravity—32.2 ft. per sec.²

This can be written in terms of the velocity necessary to develop a pull P.

$$V = P \sqrt{\frac{G}{WK}} \qquad (2)$$

The spring stiffness of the wire line is given by $$K = 12\frac{AE}{D} \qquad (3)$$

Where A is the cross sectional area of the wire in square inches, E is Young's modulus of elasticity, 30,000,000 per square inch for steel, and D is the free length of the wire in feet. The area of a steel line, 0.072 inch in diameter is 0.00407 in.$^2$. Substituting these numerical values in Equation 3 gives $$K = \frac{1,460,000}{D} \qquad (4)$$

Substituting this value of K in Equation 2 and bringing the numerical constants outside the radical gives $$V = 0.0047\sqrt{\frac{D}{W}}$$

If necessary, some of the fingers can be bent outwardly far enough that they will not engage the groove in the piston. When this is done, the engaging fingers should be as equally spaced as possible. Those bent out of action can later be returned to their original position.

As was stated above, prior to a run, the space in the sample chamber is filled with water to control the piston speed after release. This cushioning fluid performs another necessary function by preventing premature release of the piston when the device is rather suddenly exposed to well pressures at the well head preparatory to running the device in a well. Due to the constriction around the wire line at the fishing neck and the large volume above the piston, pressure could be built up more rapidly on the under side of the piston than on the upper end if the chamber were filled with air. This momentary pressure difference would then force the piston away from the spring fingers. With the space above the piston filled with water, pressure is transmitted to both ends of the piston equally.

Various liquids such as light oils, alcohols, glycols, and water may be used as the cushioning fluid. Water is preferred because it is always readily available and because it will not contaminate the sample if some migrates down the well bore and enters the inlet ports.

Although water has a greater density than the crude being sampled, it does not have time to fall to the inlet ports while the piston is pulling in the sample. The discharged water is jetted upward and breaks into small drops which fall slowly through the oil. The volume of oil in the annulus between the sampler and the tubing is considerably greater than the capacity of the sampler.

The piston release force and the anchor release force were chosen to give reasonable margins of safety in the operation of the sampler without developing excessive stress in the wire line. The following data give the minimum breaking strength of the various lines in common use. These figures are about one-fourth the ultimate tensile strength of new line.

| Wire Line Diameter, Inch | Minimum Breaking Strength, Pounds | Calculated tensile Strength at 100,000 p.s.i. Stress, Pounds |
|---|---|---|
| .066 | 825 | 3,420 |
| .072 | 980 | 4,070 |
| .082 | 1,225 | 5,280 |
| .092 | 1,500 | 6,650 |

From the foregoing it can be seen that I have invented a sampling device that can be used to obtain true samples at a known location in a well producing a very high viscosity crude as well as all types of well sampling. In addition my sampling device possesses the following advantages as compared to the samplers heretofore available.

(1) Very high ratio of chamber length to overall lenth.
(2) Ready for operation as soon as the sampling depth is reached.
(3) Surface indication to show the operator the point at which the sample was taken.
(4) Surface indication to tell the operator the sampler functioned properly.
(5) Minimum number of parts and no complicated mechanism to fail.
(6) Sample can be transferred without use of mercury.
(7) Minimum round trip time.
(8) Can be used in open hole as well as in tubing or casing.
(9) No carry down of dead fluid from the top of the fluid.
(10) Sample pressure can be measured without opening sampler.

While my sampling device is ideally suited for the taking of samples it can be easily adapted for other uses also. For example, it lends itself readily to corrosion prevention work applications when it is desirable to place the corrosion inhibitor at a definite point in the well bore. This can easily be accomplished by substituting the proper chemical for the cushioning water and operating the sampler in the usual manner at the desired depth. If it is not desired to procure samples while doing such work, the valve ball can be removed.

From the foregoing, it is believed that the construction, operation and advantages of my present invention will be readily comprehended by persons skilled in the art. It is to be understood that the form of this invention, herewith shown and described, is to be taken as a preferred example of the same and that various changes in size, shape and arrangement of parts may be resorted to without departing from the spirit of this invention. As for example, in Figure 3 is shown a modification of the check valve shown in Figures 1 and 2. Instead of using a check valve a plug attached to the piston by means of a bead type of chain to prevent kinking can be used. The chain length is so selected that the plug will be drawn into the axial passage when the piston is at the top of its movement. When this latter method is used I prefer to employ spring fingers below the closed position of the plug which will snap upward when the plug is drawn upward, thus effectively holding it in a sealing position. These fingers are shown in phantom lines.

Having described the invention, I claim:

1. A sampling device adapted to be lowered in a well bore, comprising an elongated tubular member having an upper end and a lower end, a head piece rigidly secured on the upper end of the tubular member and having an axial passageway therethrough forming an outlet from the tubular member, a foot piece on the lower end of the tubular member having a passageway therethrough forming an inlet to the tubular member, a piston slidably disposed in the tubular member and sealingly engaging the inner periphery of the tubular member, anchoring means for releasably holding the piston in the lower end portion of the tubular member as the device is lowered in the well bore, a wire line secured to the top of the piston and extending through said outlet for raising the piston in the tubular member when the device is in sampling position and for sucking well fluids into the tubular member below the piston through said inlet, and a check valve cooperating with said inlet to prevent downward flow of the well fluids from the tubular member.

2. A device as defined in claim 1 characterized further to include a supply of water filling the tubular member above the piston when the device is lowered in the well bore, and said outlet has a smaller effective cross-sectional area than said inlet to control the discharge of said water and the upward movement of the piston in taking a sample in the well bore.

3. A device as defined in claim 1 characterized further in that said check valve comprises a plug disposed below the inlet, and a chain extending from the piston to the plug of a length to pull the plug into the inlet when the piston reaches the top of the tubular member.

4. A sampling device adapted to be lowered in a well bore, comprising an elongated tubular member having an upper end and a lower end, a head piece rigidly secured on the upper end of the tubular member and having an axial passageway therethrough forming an outlet from the tubular member, a foot piece on the lower end of the tubular member and a passageway therethrough forming an inlet to the tubular member, a piston slidably disposed in the tubular member and sealingly engaging the inner periphery of the tubular member, a latch secured in the lower end of the tubular member for releasably holding the piston in the lower end portion of the tubular member as the device is lowered in the well bore, a supply of water filling the tubular member above the piston when the device is lowered in the well bore, flexible feelers extending upwardly and outwardly from said head piece to engage the well bore and retard upward movement of the device in the well bore, a wire line secured to the top of the piston and extending through said outlet for disengaging said latch and raising the piston in the tubular member when the device is in sampling position to force water through said outlet and to suck well fluids into the tubular member below the piston through said inlet, a chain depending from the piston through said inlet, and a plug secured on the lower end of the chain, said chain being of a length to pull the plug into said inlet when the piston reaches the upper end of the tubular member.

References Cited in the file of this patent

UNITED STATES PATENTS

| | | |
|---|---|---|
| 1,944,434 | Keeler | Jan. 23, 1934 |
| 2,083,714 | Keeler | June 15, 1937 |
| 2,418,500 | Chambers | Apr. 8, 1947 |
| 2,715,943 | True | Aug. 23, 1955 |